(12) United States Patent
Hendrian et al.

(10) Patent No.: US 11,030,906 B2
(45) Date of Patent: Jun. 8, 2021

(54) SYSTEM FOR TAKING INTO ACCOUNT MICRO WIND CONDITIONS IN FLIGHT PLANS FOR AERIAL VEHICLES

(71) Applicant: The Boeing Company, Chicago, IL (US)

(72) Inventors: Matthew B. Hendrian, Aurora, CO (US); Ralf Rene Shu-Zhong Cabos, Braunschweig (DE); Nils Kneuper, Bergkamen (DE)

(73) Assignee: The Boeing Company, Chicago, IL (US)

(*) Notice: Subject to any disclaimer, the term of this patent is extended or adjusted under 35 U.S.C. 154(b) by 393 days.

(21) Appl. No.: 15/815,699

(22) Filed: Nov. 16, 2017

(65) Prior Publication Data
US 2019/0147753 A1 May 16, 2019

(51) Int. Cl.
*G08G 5/00* (2006.01)
*G05D 1/10* (2006.01)
*B64C 39/02* (2006.01)

(52) U.S. Cl.
CPC ......... *G08G 5/0091* (2013.01); *B64C 39/024* (2013.01); *G05D 1/104* (2013.01); *G08G 5/0013* (2013.01); *G08G 5/0021* (2013.01); *G08G 5/0026* (2013.01); *G08G 5/0039* (2013.01); *G08G 5/0069* (2013.01); *B64C 2201/12* (2013.01); *B64C 2201/145* (2013.01)

(58) Field of Classification Search
CPC .. G08G 5/0091; G08G 5/0021; G08G 5/0026; G08G 5/0013; G08G 5/0069; G08G 5/0039; B64C 39/024; B64C 2201/12; B64C 2201/128; B64C 2201/145; G05D 1/0204; G05D 1/104
See application file for complete search history.

(56) References Cited

U.S. PATENT DOCUMENTS

| | | | |
|---|---|---|---|
| 8,314,730 B1 | 11/2012 | Musaik et al. | |
| 9,334,052 B2 | 5/2016 | Pasko et al. | |
| 9,816,863 B1* | 11/2017 | Lietzke | G01J 5/007 |
| 10,023,323 B1* | 7/2018 | Roberts | B64D 43/00 |
| 10,698,422 B2* | 6/2020 | Tuukkanen | G06Q 10/047 |
| 2003/0001770 A1 | 1/2003 | Cornell et al. | |
| 2006/0155432 A1 | 7/2006 | Brown | |
| 2008/0140318 A1 | 6/2008 | Breed | |
| 2014/0081569 A1 | 3/2014 | Agrawal et al. | |
| 2015/0039161 A1* | 2/2015 | Hastings | B64C 39/022 701/3 |
| 2015/0336671 A1 | 11/2015 | Winn et al. | |

(Continued)

OTHER PUBLICATIONS

Kapoor, Ashish & Horvitz, Zachary & Laube, Spencer & Horvitz, Eric. (2014). Airplanes aloft as a sensor network for wind forecasting. 25-34. 10.1109/IPSN.2014.6846738. (Year: 2014).*

(Continued)

*Primary Examiner* — Jeffrey C Boomer
(74) *Attorney, Agent, or Firm* — Yee & Associates, P.C.

(57) ABSTRACT

A system for taking into account micro wind conditions in a region. The system comprises a plurality of aerial vehicles within the region and a wind speed calculator. Each of the plurality of aerial vehicles has an altitude sensor and a GPS receiver. The wind speed calculator is configured to determine wind vectors within the region using measurements from the plurality of aerial vehicles.

31 Claims, 13 Drawing Sheets

(56) References Cited

U.S. PATENT DOCUMENTS

| | | | | |
|---|---|---|---|---|
| 2015/0379408 A1* | 12/2015 | Kapoor | ............... | G01W 1/10 |
| | | | | 706/46 |
| 2016/0055752 A1* | 2/2016 | Mccann | ............ | G08G 5/0039 |
| | | | | 701/533 |
| 2016/0210866 A1* | 7/2016 | Pierre | ............... | G01C 21/00 |
| 2016/0210867 A1* | 7/2016 | Pierre | ............ | G08G 5/0091 |
| 2018/0300834 A1* | 10/2018 | High | ................ | G06Q 50/28 |
| 2019/0265735 A1* | 8/2019 | Ishikawa | ............ | B64C 13/18 |

OTHER PUBLICATIONS

NOAA, Earth System Research Laboratory; "Improvement sin HRRRv2/RAPv3". Sep. 13, 2016. (Year: 2016).*
Netherlands Patent Office/Enterprise Agency Office Search Report, Written Opinion, and English translation, dated Aug. 31, 2018, regarding Application No. NL2020098, 11 pages.
European Patent Office Communication and Extended Search Report, dated Apr. 8, 2019, regarding Application No. 18206047.5, 10 pages.

* cited by examiner

FROM FIG. 11A 

1124 — GENERATING A THREE-DIMENSIONAL WIND PREDICTION MAP FOR THE REGION FOR THE FUTURE TIME USING THE THREE-DIMENSIONAL MODEL OF THE REGION AND THE COARSELY-GRAINED FORECAST, WHEREIN PLANNING THE FLIGHT PLAN WITHIN THE REGION COMPRISES PLANNING THE FLIGHT PLAN USING THE THREE-DIMENSIONAL WIND PREDICTION MAP FOR THE REGION FOR THE FUTURE TIME

1110 — PLANNING A FLIGHT PLAN WITHIN THE REGION FOR AN AERIAL VEHICLE BASED ON THE WIND SPEEDS DETERMINED

1116 — WHEREIN PLANNING THE FLIGHT PLAN WITHIN THE REGION FOR THE AERIAL VEHICLE BASED ON THE WIND SPEEDS DETERMINED COMPRISES CREATING A MODIFIED FLIGHT PLAN FOR THE AERIAL VEHICLE WHILE THE AERIAL VEHICLE IS ACTIVELY FLYING

1112 — WHEREIN THE AERIAL VEHICLE IS AN UNMANNED AERIAL VEHICLE, AND WHEREIN PLANNING THE FLIGHT PLAN WITHIN THE REGION FOR THE AERIAL VEHICLE COMPRISES: DETERMINING A MAXIMUM ACCEPTABLE TURBULENCE FOR CARGO OF THE UNMANNED AERIAL VEHICLE; AND PLANNING THE FLIGHT PLAN SUCH THAT THE UNMANNED AERIAL VEHICLE IS PROJECTED TO ENCOUNTER TURBULENCE BELOW THE MAXIMUM ACCEPTABLE TURBULENCE

1114 — WHEREIN THE AERIAL VEHICLE IS AN UNMANNED AERIAL VEHICLE, AND WHEREIN PLANNING THE FLIGHT PLAN WITHIN THE REGION FOR THE AERIAL VEHICLE COMPRISES: DETERMINING A DELIVER BY TIME FOR CARGO OF THE UNMANNED AERIAL VEHICLE; AND PLANNING THE FLIGHT PLAN SUCH THAT THE UNMANNED AERIAL VEHICLE IS PROJECTED TO DELIVER THE CARGO PRIOR TO THE DELIVER BY TIME

1118 — FLYING THE AERIAL VEHICLE WITHIN THE REGION ACCORDING TO THE FLIGHT PLAN

END

FIG. 11B

SYSTEM FOR TAKING INTO ACCOUNT MICRO WIND CONDITIONS IN FLIGHT PLANS FOR AERIAL VEHICLES

BACKGROUND INFORMATION

1. Field

The present disclosure relates generally to operating aerial vehicles and, more specifically, to taking into account micro wind conditions when operating aerial vehicles.

2. Background

Flight plans for commercial aircraft are planned with coarsely-grained wind forecasts generated by weather entities, such as the National Weather Service. Coarsely-grained wind forecasts are commonly generated with a 0.5° lateral resolution, as well as a 50 millibar vertical resolution. While this resolution is sufficient for commercial aircraft covering thousands of miles of distance, this resolution is not able to capture the "microscopic" winds in between the resolution points/coordinates.

Unmanned aerial vehicles typically fly significantly shorter distances than commercial aircraft. Some unmanned aerial vehicles delivering cargo or taxiing passengers may travel only within the region bounded by a 0.5° lateral resolution. Due to the resolution, coarsely-grained wind forecasts do not provide details of the weather along flight paths for these unmanned aerial vehicles. For example, wind vectors along the flight paths are unknown.

Some unmanned aerial vehicles may fly at altitudes considerably higher than weather gauges. Unmanned aerial vehicles fly at altitudes lower than cruising altitudes for commercial aircraft. Wind speed and direction change with altitude. Wind vectors and directions gathered at the weather gauges may not be desirable for forming flight plans for unmanned aerial vehicles. Wind vectors and directions gathered from commercial aircraft may not be desirable for forming flight plans for unmanned aerial vehicles.

Therefore, it would be desirable to have a method and apparatus that take into account at least some of the issues discussed above, as well as other possible issues. For example, it would be desirable to have a method and apparatus that aids in flying unmanned aerial vehicles in a region. As another example, it would be desirable to have a method and apparatus that create flight plans for unmanned aerial vehicles that take into account conditions within a region.

SUMMARY

An illustrative embodiment of the present disclosure provides a system for taking into account micro wind conditions in a region. The system comprises a plurality of aerial vehicles within the region and a wind speed calculator. Each of the plurality of aerial vehicles has an altitude sensor and a GPS receiver. The wind speed calculator is configured to determine wind vectors within the region using measurements from the plurality of aerial vehicles.

Another illustrative embodiment of the present disclosure provides a method. Altitude measurements are collected for a plurality of aerial vehicles while the plurality of aerial vehicles is flying in a region. Wind vectors within the region are determined using the plurality of aerial vehicles.

A further illustrative embodiment of the present disclosure provides a method. Wind vectors within a region at a first time are determined using a plurality of aerial vehicles flying in the region. A three-dimensional wind map of the region is generated, including interpolated wind vectors based on the wind vectors. The three-dimensional wind map is correlated with a coarsely-grained forecast for the region at the first time. A three-dimensional model of the region is trained with the three-dimensional wind map correlated with the coarsely-grained forecast for the region at the first time. A coarsely-grained forecast for the region at a second time is received. A three-dimensional wind prediction map for the region at the second time is created.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 11A and 11B are an illustration of a flowchart of a method for flying an aerial vehicle in a region based on wind vectors determined in the region in accordance with an illustrative embodiment.

DETAILED DESCRIPTION

The illustrative embodiments recognize and take into account one or more different considerations. For example, the illustrative embodiments recognize and take into account that unmanned aerial vehicles are advantageous in several scenarios. The illustrative embodiments recognize and take into account that unmanned aerial vehicles can be used for delivery of packages by a store or vendor. The illustrative embodiments recognize and take into account that unmanned aerial vehicles can be used for delivery of fast food orders. The illustrative embodiments recognize and take into account that unmanned aerial vehicles can be used for transport of human or animal passengers.

The illustrative embodiments recognize and take into account that unmanned aerial vehicles (UAVs) need to file flight plans. The illustrative embodiments recognize and take into account that because the flights of unmanned aerial vehicles cover shorter distances, the coarsely granular nature of wind forecasts do not desirably aid in developing flight plans for unmanned aerial vehicles. For example, coarsely-grained wind forecasts do not provide a desirable amount of information for determining the most cost-effective route.

The illustrative embodiments recognize and take into account that it would be desirable to provide a three-dimensional "live" or real-time view of winds in a region. The illustrative embodiments further recognize and take into account that a plurality of unmanned aerial vehicles in a region can be used to collect measurements to determine wind vectors within the region. The illustrative embodiments also recognize and take into account that the real-time view of the winds in the region may be used to create a wind prediction for a future time. The illustrative embodiments additionally recognize and take into account that wind vectors at a pre-determined grid may be determined using the real-time view of the winds.

The illustrative embodiments also recognize and take into account that turbulence is undesirable for unmanned aerial vehicles. The illustrative embodiments also recognize and take into account that it is desirable to be able to pre-determine corrections that an unmanned aerial vehicle should perform to reduce encountered turbulence by the unmanned aerial vehicle.

Figure 1:
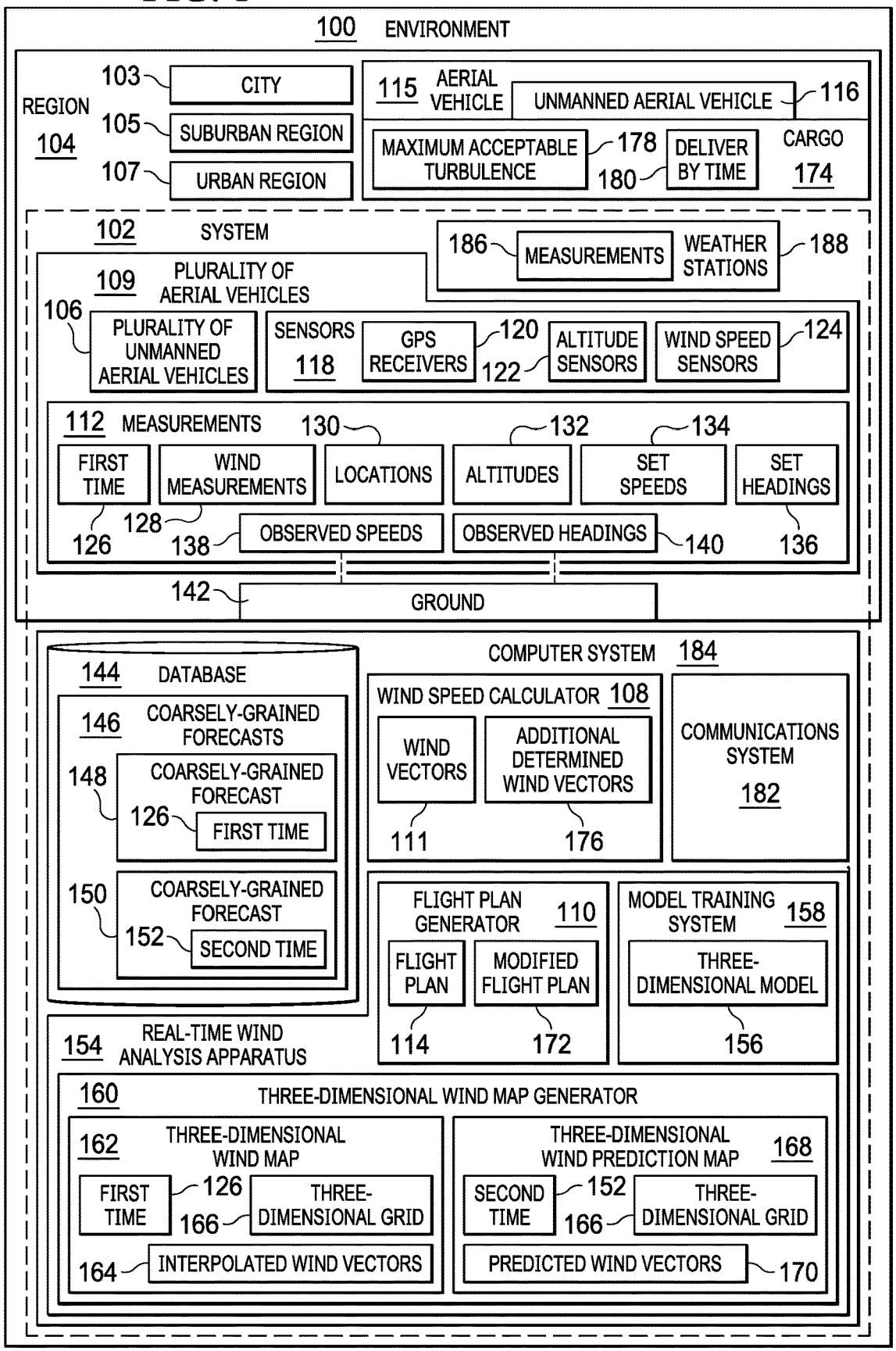
FIG. 1 is an illustration of a block diagram of an environment in which an unmanned aerial vehicle flies using a flight plan taking into account micro wind conditions in accordance with an illustrative embodiment.

Referring now to the figures and, in particular, with reference to FIG. 1, an illustration of a block diagram of an environment in which an unmanned aerial vehicle flies using a flight plan taking into account micro wind conditions is depicted in accordance with an illustrative embodiment. Environment 100 contains system 102 for taking into account micro wind conditions in region 104. In some illustrative examples, region 104 is within a single 0.5° lateral resolution grid.

In some illustrative examples, region 104 is at least one of suburban region 105 or urban region 107. In some illustrative examples, region 104 is a city 103. City 103 includes at least one of suburban region 105 or urban region 107.

System 102 comprises plurality of aerial vehicles 109 within region 104 and wind speed calculator 108. In some illustrative examples, system 102 also comprises flight plan generator 110. In some illustrative examples, plurality of aerial vehicles 109 comprises plurality of unmanned aerial vehicles 106.

Wind speed calculator 108 is configured to determine wind vectors 111 within region 104 using measurements 112 from plurality of aerial vehicles 109. When plurality of aerial vehicles 109 comprises plurality of unmanned aerial vehicles 106, wind speed calculator 108 is configured to determine wind vectors 111 within region 104 using measurements 112 from plurality of unmanned aerial vehicles 106.

Flight plan generator 110 is configured to create flight plan 114 within region 104 for aerial vehicle 115 based on wind vectors 111 determined by wind speed calculator 108. As used herein, the terms "flight plan" and "flight path," may be used interchangeably. When aerial vehicle 115 takes the form of unmanned aerial vehicle 116, flight plan generator 110 is configured to create flight plan 114 within region 104 for unmanned aerial vehicle 116 based on wind vectors 111 determined by wind speed calculator 108.

Each of plurality of aerial vehicles 109 has an altitude sensor and a GPS receiver. As depicted, plurality of aerial vehicles 109 has sensors 118, including GPS receivers 120 and altitude sensors 122. In some illustrative examples, sensors 118 on plurality of aerial vehicles 109 will include other desirable sensors. In some illustrative examples, plurality of aerial vehicles 109 also includes wind speed sensors 124.

When plurality of aerial vehicles 109 comprises plurality of unmanned aerial vehicles 106, each of plurality of unmanned aerial vehicles 106 has sensors 118. For example, when present, each of plurality of unmanned aerial vehicles 106 has an altitude sensor and a GPS receiver.

Measurements 112 are associated with first time 126. Measurements 112 are obtained using sensors 118.

Wind vectors 111 within region 104 at first time 126 are determined using measurements 112 from plurality of aerial vehicles 109. In some illustrative examples, the micro winds within region 104 are directly measured from plurality of aerial vehicles 109. In these illustrative examples, measurements 112 include wind measurements 128 taken by wind speed sensors 124. In these illustrative examples, wind speed calculator 108 associates wind measurements 128 with locations 130 and altitudes 132 of plurality of aerial vehicles 109 to form wind vectors 111.

In some other illustrative examples, the micro winds within region 104 are indirectly measured using plurality of aerial vehicles 109. In some illustrative examples, wind vectors 111 are determined using calculations and measurements 112. In these illustrative examples, measurements 112 include set speeds 134 and set headings 136. In some illustrative examples, set speeds 134 and set headings 136 at first time 126 are provided from flight plans of plurality of aerial vehicles 109. In some illustrative examples, set speeds 134 and set headings 136 at first time 126 are provided from controllers of plurality of aerial vehicles 109.

In some illustrative examples, measurements 112 include observed speeds 138 and observed headings 140. Observed speeds 138 and observed headings 140 may be determined relative to ground 142 in region 104. In some illustrative examples, observed speeds 138 and observed headings 140 are determined using GPS receivers 120 of plurality of aerial vehicles 109.

In some illustrative examples, wind speed calculator 108 is configured to determine wind vectors 111 using vector addition, set speeds 134 of plurality of aerial vehicles 109, set headings 136 of plurality of aerial vehicles 109, observed speeds 138 of plurality of aerial vehicles 109, and observed headings 140 of plurality of aerial vehicles 109.

Wind vectors 111 are determined for micro winds in region 104 at first time 126. Wind vectors 111 are located at locations 130 of plurality of aerial vehicles 109 at first time 126. Wind vectors 111 are saved to database 144 of system 102.

Database 144 also includes coarsely-grained forecasts 146. Coarsely-grained forecasts 146 are forecasts for region 104. As depicted, coarsely-grained forecasts 146 includes coarsely-grained forecast 148 at first time 126 and coarsely-grained forecast 150 at second time 152.

Information from database 144 is introduced to real-time wind analysis apparatus 154. Information from database 144 is used by real-time wind analysis apparatus 154 to train three-dimensional model 156 of region 104. For example, wind vectors 111 at first time 126 and coarsely-grained forecast 148 at first time 126 may be provided for model training system 158 to train three-dimensional model 156.

Three-dimensional model 156 is a representation of region 104. Three-dimensional model 156 includes any desirable features of region 104. In some illustrative examples, three-dimensional model 156 includes buildings. In some illustrative examples, three-dimensional model 156 includes vegetation. Some features of three-dimensional model 156 may change over time. For example, buildings may be built or removed from region 104 over time. As another example, leaves from trees or other vegetation in region 104 may not be present during the fall and winter months. As yet another example, temporary structures may be erected and then removed within region 104.

Model training system 158 may make modifications to three-dimensional model 156 based on input from database 144. For example, model training system 158 may modify three-dimensional model 156 based on a coarsely-grained forecast of coarsely-grained forecasts 146 and wind vectors determined by wind speed calculator 108 and correlated to that coarsely grained forecast. In one example, model training system 158 may modify three-dimensional model 156 based on coarsely-grained forecast 148 of coarsely-grained forecasts 146 and wind vectors 111 determined by wind speed calculator 108 and correlated to coarsely grained forecast 148. Modifications to three-dimensional model 156 take into account changes within region 104, such as any changes to buildings or vegetation present in region 104.

Information from database 144 is used by three-dimensional wind map generator 160 to generate a three-dimensional wind map of micro winds within region 104. Three-dimensional wind map generator 160 uses input from database 144 and three-dimensional model 156 to generate a three-dimensional wind map.

In one illustrative example, three-dimensional wind map generator 160 generates three-dimensional wind map 162 for first time 126. Three-dimensional wind map 162 may be referred to as a "real-time" or current wind map. Three-dimensional wind map 162 includes interpolated wind vectors 164. Interpolated wind vectors 164 are associated with set grid points within region 104. Interpolated wind vectors 164 are on three-dimensional grid 166. Interpolated wind vectors 164 are associated with set grid points of three-dimensional grid 166 within region 104. Three-dimensional wind map 162 of region 104 is generated including interpolated wind vectors 164 based on wind vectors 111.

Three-dimensional grid 166 is a grid in both lateral and vertical dimensions. Three-dimensional grid 166 explicitly defines locations by latitude/longitude/altitude. Locations 130 of wind vectors 111 are scattered throughout region 104 based on assigned operations and flight paths of plurality of aerial vehicles 109. By tailoring wind vectors 111 to a grid, such as three-dimensional grid 166, wind vectors 111 may be used in training using model training system 158. The tailoring process may be described as interpolation between wind vectors 111 so that interpolated wind vectors 164 at each grid point of three-dimensional grid 166 are calculated. In some illustrative examples, wind vectors, such as interpolated wind vectors 164, on a lateral scale are calculated at each grid point. In some illustrative examples, wind vectors, such as interpolated wind vectors 164, on a lateral scale, as well as at different altitudes, are calculated at each grid point.

Interpolated wind vectors 164 along locations in three-dimensional grid 166 are determined through interpolation. As a result, interpolated wind vectors 164 includes a wind speed at each coordinate point of three-dimensional grid 166. This is performed for all points of three-dimensional grid 166.

In another example, three-dimensional wind map generator 160 generates three-dimensional wind prediction map 168. Three-dimensional wind prediction map 168 is a map for predicted wind vectors 170 at second time 152. Second time 152 is a future time. Second time 152 occurs after first time 126.

Predicted wind vectors 170 are wind vectors at each point of three-dimensional grid 166 at second time 152. As depicted, three-dimensional wind map 162 at first time 126 and three-dimensional wind prediction map 168 at second time 152 have the same three-dimensional grid, three-dimensional grid 166. Predicted wind vectors 170 are determined using three-dimensional model 156 and coarsely-grained forecast 150 at second time 152.

Flight plan generator 110 generates flight plans using three-dimensional wind maps generated by three-dimensional wind map generator 160. In some illustrative examples, flight plan generator 110 generates flight plans using three-dimensional wind map 162 for first time 126. In some illustrative examples, flight plan generator 110 generates flight plans using a three-dimensional wind prediction map for a future time such as three-dimensional wind prediction map 168 at second time 152.

In some illustrative examples, flight plan generator 110 may generate new flight plans prior to takeoff. For example, flight plan generator 110 may create flight plan 114 for unmanned aerial vehicle 116 prior to takeoff of unmanned aerial vehicle 116. In some illustrative examples, flight plan generator 110 may generate modified flight plans during flight of a respective unmanned aerial vehicle. For example, flight plan generator 110 may create modified flight plan 172 for unmanned aerial vehicle 116 as unmanned aerial vehicle 116 flies through region 104.

Flight plan 114 takes into account micro winds within region 104. Flight plan 114 takes into account any desirable parameters of at least one of unmanned aerial vehicle 116 or cargo 174. For example, flight plan 114 may take into account at least one of fuel efficiency, turbulence, maximum altitude, maximum speed of unmanned aerial vehicle 116, dimensions of unmanned aerial vehicle 116, order parameters, cargo type, or any other desirable parameters.

In some illustrative examples, flight plan generator 110 is configured to determine maximum acceptable turbulence 178 for cargo 174 of unmanned aerial vehicle 116 and plan flight plan 114 such that unmanned aerial vehicle 116 is projected to encounter turbulence below maximum acceptable turbulence 178. In some illustrative examples, flight plan generator 110 is configured to determine deliver by time 180 for cargo 174 of unmanned aerial vehicle 116, and plan flight plan 114 such that unmanned aerial vehicle 116 is projected to deliver cargo 174 prior to deliver by time 180.

In some illustrative examples, flight plan generator 110 is configured to create flight plan 114 using three-dimensional wind prediction map 168 for region 104 for a future time. In some illustrative examples, three-dimensional wind map generator 160 is configured to generate a three-dimensional wind prediction map for region 104 for a future time using three-dimensional model 156 of region 104 and a coarsely-grained forecast for the future time. For example, three-dimensional wind map generator 160 is configured to generate three-dimensional wind prediction map 168 for region 104 for second time 152 using three-dimensional model 156 of region 104 and coarsely-grained forecast 150 for second time 152.

In some illustrative examples, model training system 158 is configured to continuously check three-dimensional model 156. For example, model training system 158 may verify appropriate outputs as new inputs are received. Model training system 158 is configured to refine and update three-dimensional model 156 of region 104 using additional determined wind vectors 176 and received coarsely-grained forecasts 146 for region 104.

System 102 includes communication system 182 configured to communicate flight plans with plurality of aerial vehicles 109. Communication system 182 communicates flight plan 114 with unmanned aerial vehicle 116.

During operation of system 102, real-time wind measurements/reports, such as wind vectors 111, are first matched with their respective coarsely-grained wind forecast (from e.g. the National Weather Service). For example, winds at 3 pm are matched to their 3 pm forecast. In some illustrative examples, the forecast may be published prior to the valid time. For instance, a forecast published at 1 pm may be valid at 3 pm.

After matching, the instance pair formed by matching wind vectors 111 with coarsely grained forecast 148 is saved to database 144. This instance pair will then be used in predictive real-time model/machine learning algorithm training, such as by model training system 158, occurring in real-time wind analysis apparatus 154. In some illustrative examples, the algorithms are used to predict a future three-dimensional view of the winds when a new coarsely-grained forecast arrives. Another output of real-time wind analysis apparatus 154 may be the current/live/real-time 3D wind speed view. These two outputs can, in the following, be used to either plan flights "right now," i.e. with the current micro live wind situation or to plan flights at a future time using the predicted micro wind situation At any time t, wind vectors 111 are determined using plurality of aerial vehicles 109 present in region 104, with this information relayed to real-time wind analysis apparatus 154. Upon arrival, interpolated wind vectors 164 along the locations in the defined grid, three-dimensional grid 166, are determined through interpolation. Using interpolation, interpolated wind vectors 164 valid at each coordinate point of three-dimensional grid 166 are known. This is performed for all points of three-dimensional grid 166. Should a coarsely-grained forecast be available for this current point in time, it is then matched with this three-dimensional wind map 162 and saved in database 144.

Following matching a three-dimensional wind map with a coarsely grained forecast, this match is transferred from the database to real-time wind analysis apparatus 154. The matches or, "instance pairs," are recurrently used to train machine learning algorithms in model training system 158. A Lambda architecture can be employed, which ensures a real-time algorithm training using streams of data.

In some illustrative examples, real-time wind analysis apparatus 154 may be used to form a three-dimensional wind prediction map, such as three-dimensional wind prediction map 168, in response to receiving a new coarsely-grained forecast. When a new coarsely-grained forecast arrives, which forecasts wind values at some point in the future, t2, this forecast is then applied to the machine learning algorithms, which then generate a prediction for three-dimensional wind prediction map 168 in region 104, valid for time t2. This also resembles the output of the apparatus and serves as input to flight plan generator 110 generating flight plans for unmanned aerial vehicles flying in region 104.

Real-time wind analysis apparatus 154 may be implemented in at least one of hardware or software. As depicted, real-time wind analysis apparatus 154 is implemented in computer system 184. As depicted, computer system 184 is not present within region 104. However, in other illustrative examples, computer system 184 may be present within region 104.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The illustration of environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, wind speed calculator 108 may receive additional measurements from other equipment or structures than plurality of aerial vehicles 109. In some illustrative examples, wind speed calculator 108 receives measurements 186 from weather stations 188. In these illustrative examples, wind speed calculator 108 is configured to determine wind vectors 111 within region 104 using measurements 112 from plurality of aerial vehicles 109 and measurements 186 from weather stations 188.

Weather stations 188 are at fixed locations within region 104. For each weather station of weather stations 188, the respective latitude, respective longitude, and respective altitude does not change. In some illustrative examples, each of measurements 186 includes the respective latitude, respective longitude, and respective altitude for the respective measurement. In other illustrative examples, each of measurements 186 includes an identification number for a respective weather station of weather stations 188. The identification number may be correlated to a respective latitude, respective longitude, and respective altitude for the respective weather station by wind speed calculator 108.

Figure 2:
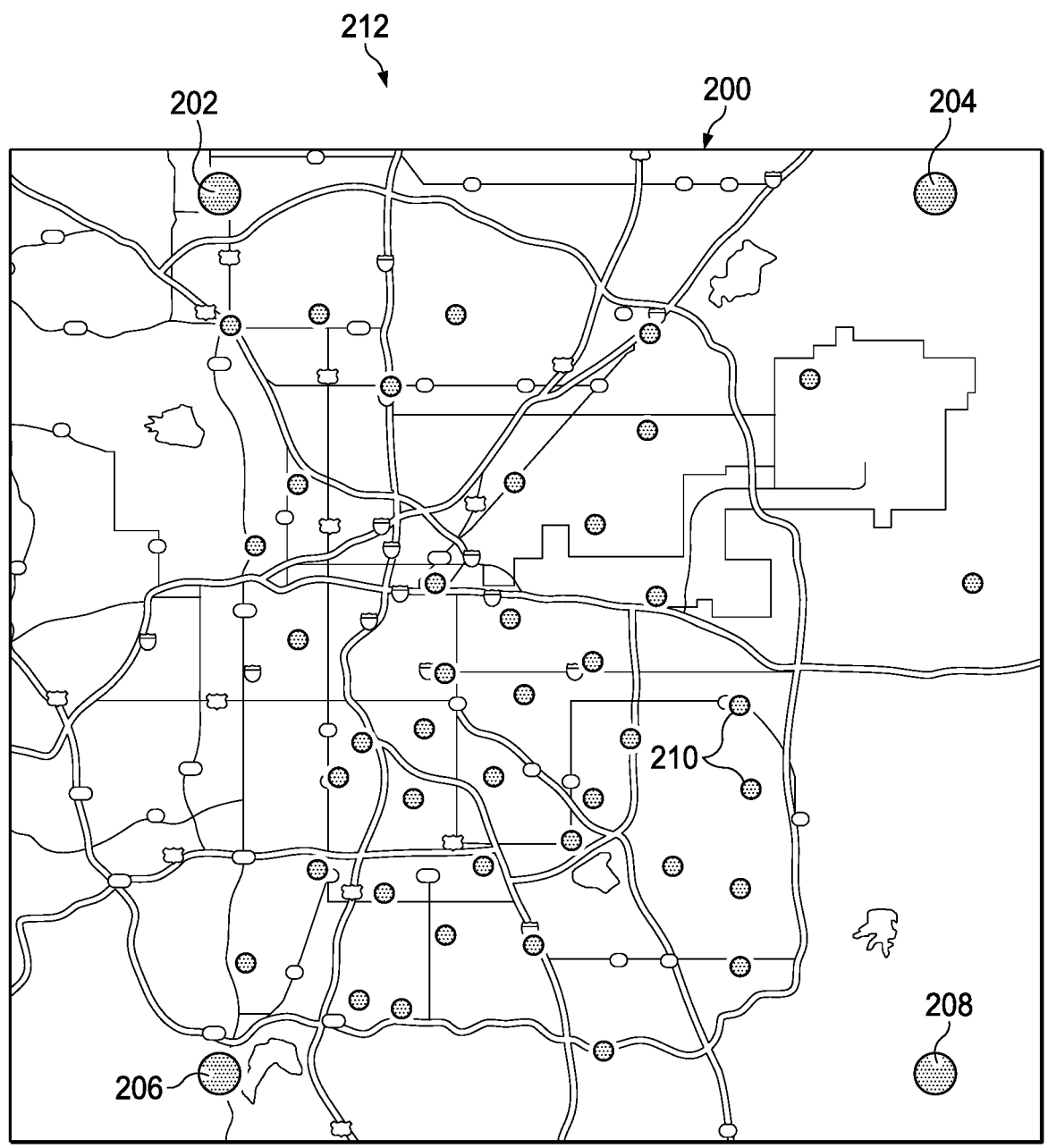
FIG. 2 is an illustration of a two-dimensional view of locations for a plurality of aerial vehicles identified in a region in accordance with an illustrative embodiment.

Turning now to FIG. 2, an illustration of a two-dimensional view of locations for a plurality of aerial vehicles identified in a region is depicted in accordance with an illustrative embodiment. Region 200 is a physical implementation of region 104 of FIG. 1. As depicted, region 200 includes at least one of a suburban region or an urban region. As depicted, region 200 includes a city.

Region 200 is positioned between marker 202, marker 204, marker 206, and marker 208. In some illustrative examples, region 200 is within a single 0.5° lateral resolution grid. In these illustrative examples, marker 202, marker 204, marker 206, and marker 208 identify the single 0.5° lateral resolution grid. While a forecast will exist at each of the coordinates, marker 202, marker 204, marker 206, and marker 208, the wind situation in between them is unknown.

Assuming an operator of an unmanned aerial vehicle wants to deliver parcels to homes in the city within region 200, the operator would like to know wind vectors and wind directions within the city. Using the wind vectors and wind directions within the city, the operator may plan more desirable flight routes. For example, using the wind vectors and wind directions within the city, the operator may plan flight plans with reduced turbulence. As another example, using the wind vectors and wind directions within the city, the operator may plan flight plans with reduced fuel usage. As yet another example, using the wind vectors and wind directions within the city, the operator may plan flight plans with reduced flight time.

As depicted, plurality of points 210 are present within region 200. Plurality of points 210 represent positions of aerial vehicles flying within region 200. The aerial vehicles are physical implementations of plurality of aerial vehicles 109 of FIG. 1. More specifically, the aerial vehicles may be physical implementations of plurality of unmanned aerial vehicles 106 of FIG. 1. Although plurality of points 210 are described as a plurality of unmanned aerial vehicles, in some illustrative examples, plurality of points 210 may represent any quantity of conventional aircraft in place of or in addition to unmanned aerial vehicles. Although plurality of points 210 are depicted in a two-dimensional setting, in a three-dimensional setting, plurality of points 210 also include an altitude for each unmanned aerial vehicle of the plurality of unmanned aerial vehicles.

View 212 of region 200 is a snapshot view at a first time, such as first time 126 of FIG. 1. Plurality of points 210 will be positioned at different locations within region 200 at a second time (not depicted).

In some illustrative examples, view 212 is an exemplary presence of unmanned aerial vehicles employed by a company using large numbers of unmanned aerial vehicles for operations. In these illustrative examples, unmanned aerial vehicles may be employed by a company delivering cargo in a city. In some illustrative examples, view 212 is an exemplary presence of unmanned aerial vehicles employed by several operators.

Due to the quantity of unmanned aerial vehicles operating within region 200, a good coverage of region 200 can be generated. Sensors connected to the unmanned aerial vehicles represented by plurality of points 210 create measurements for determining wind vectors within region 200.

Figure 3:
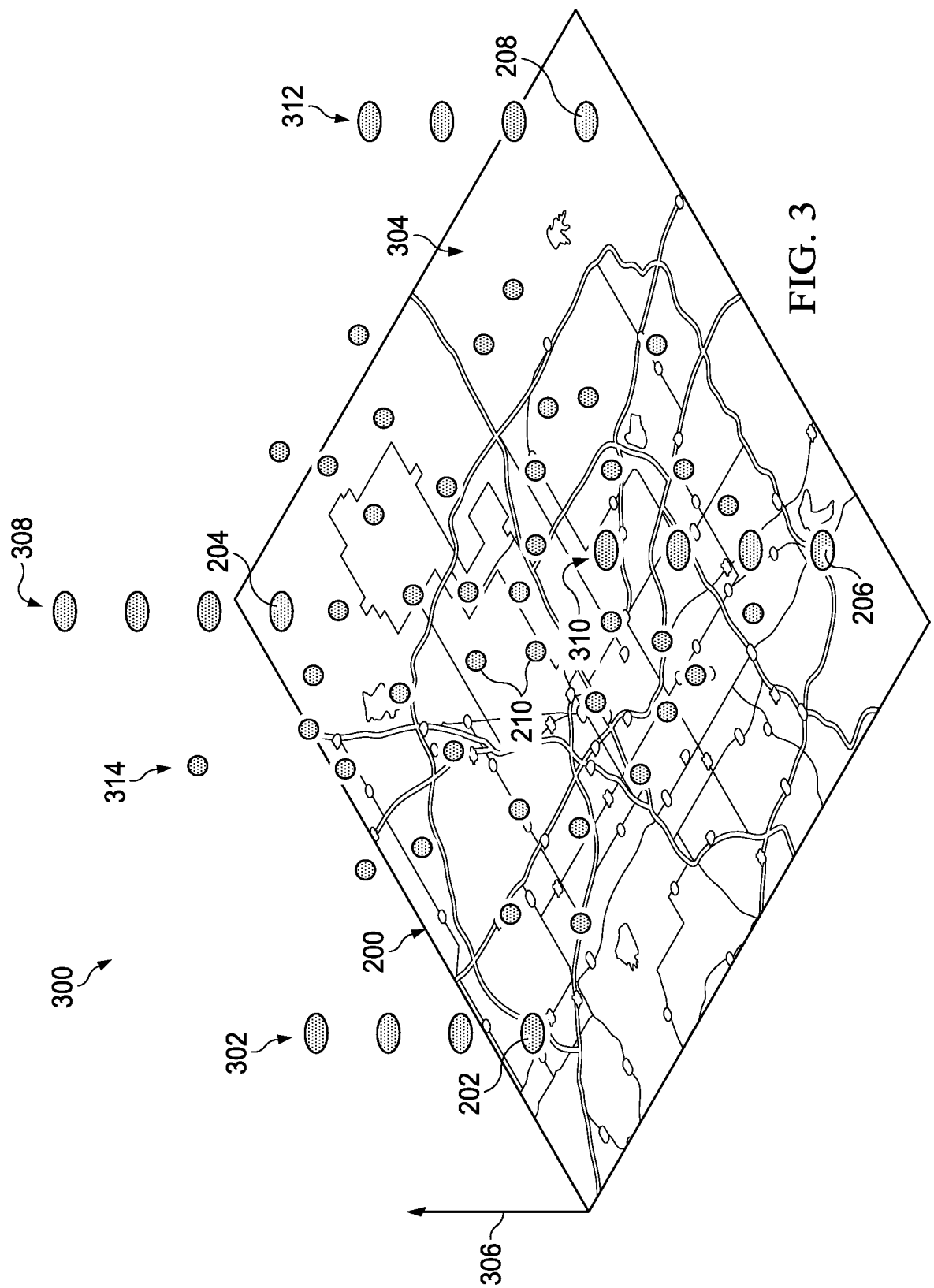
FIG. 3 is an illustration of a three-dimensional view of locations for a plurality of aerial vehicles identified in a region in accordance with an illustrative embodiment.

Turning now to FIG. 3, an illustration of a three-dimensional view of locations for a plurality of aerial vehicles identified in a region is depicted in accordance with an illustrative embodiment. View 300 is a three-dimensional view of region 200 of FIG. 2.

As can be seen in view 300, marker 202 is one of series of stacked markers 302 extending from ground 304 upward in direction 306. As can be seen in view 300, marker 204 is one of series of stacked markers 308 extending from ground 304 upward in direction 306. As can be seen in view 300, marker 206 is one of series of stacked markers 310 extending from ground 304 upward in direction 306. As can be seen in view 300, marker 208 is one of series of stacked markers 312 extending from ground 304 upward in direction 306.

In view 300, plurality of points 210 is present in a three-dimensional space. Plurality of points 210 represents positions of unmanned aerial vehicles flying within region 200 including altitudes 314, such as altitudes 132 of FIG. 1. Although plurality of points 210 are described as a plurality of unmanned aerial vehicles, in some illustrative examples, plurality of points 210 may represent any quantity of conventional aircraft in place of or in addition to unmanned aerial vehicles.

Figure 4:
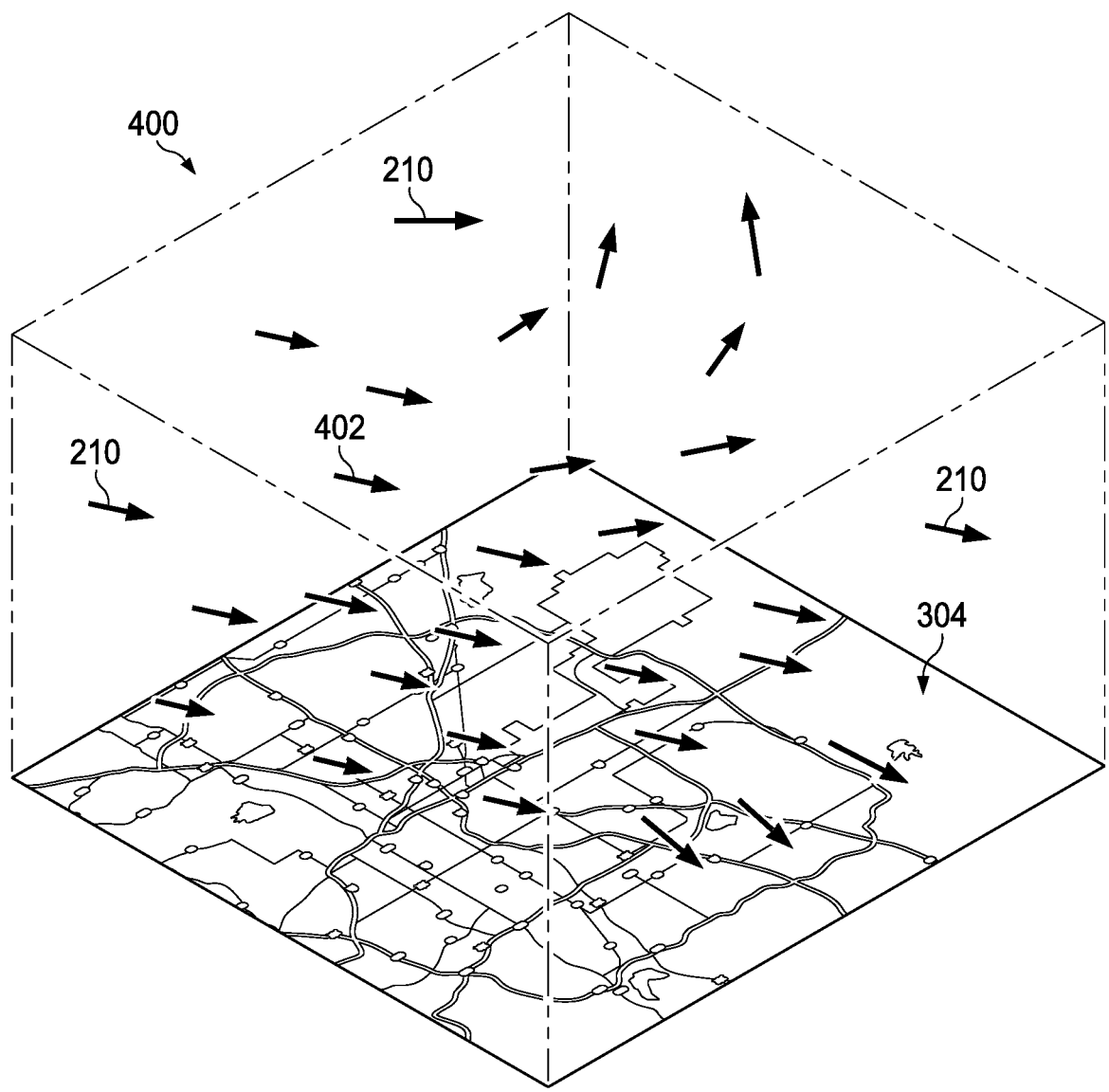
FIG. 4 is an illustration of a three-dimensional view of determined wind vectors in a region in accordance with an illustrative embodiment.

Turning now to FIG. 4, an illustration of a three-dimensional view of determined wind vectors in a region is depicted in accordance with an illustrative embodiment. In view 400, plurality of points 210 are replaced by wind vectors 402. Each of wind vectors 402 represents wind vectors determined by a wind speed calculator, such as wind speed calculator 108 of FIG. 1. Each of wind vectors 402 includes a wind speed and a wind direction. Each of wind vectors 402 is associated with a point of plurality of points 210.

Figure 5:
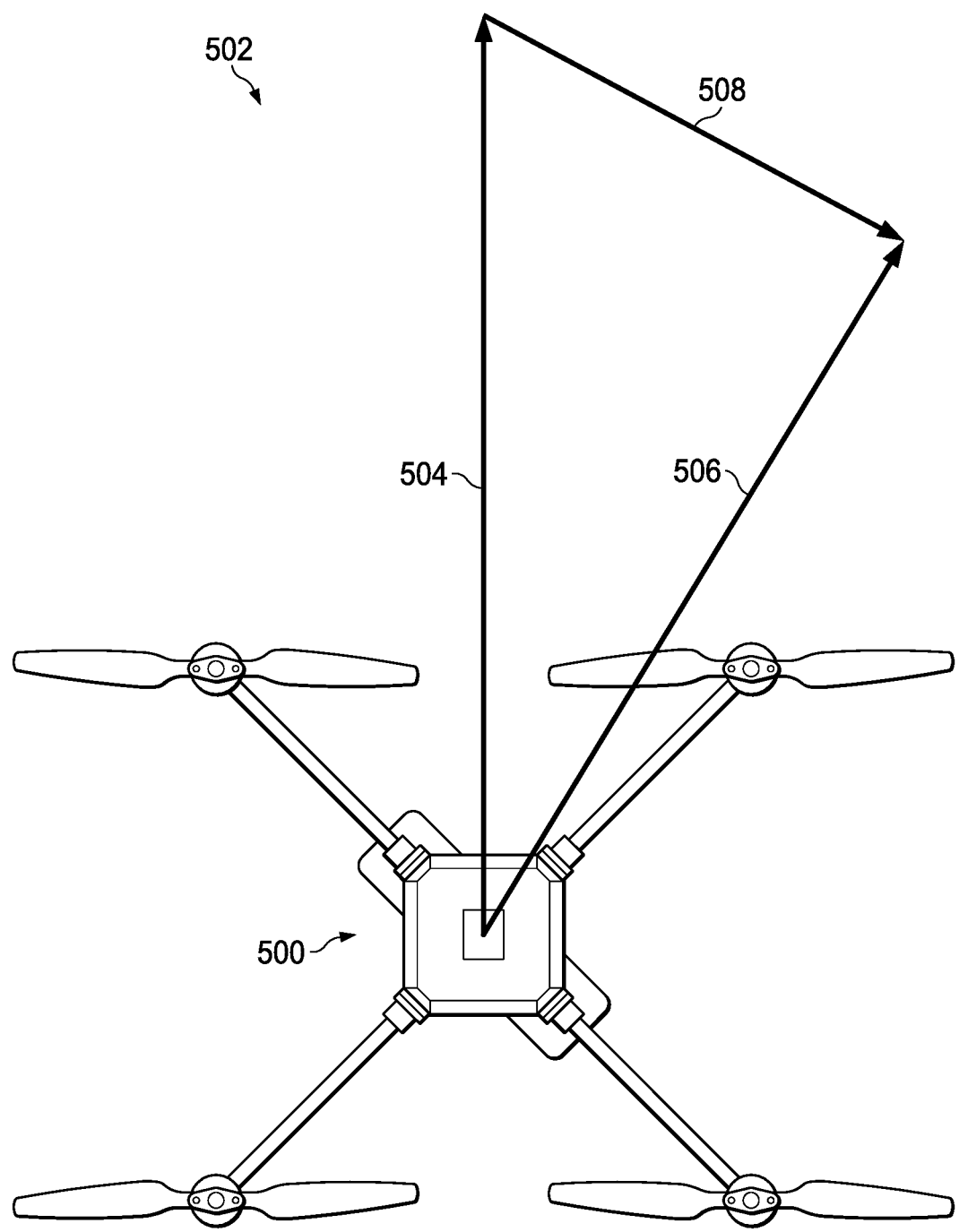
FIG. 5 is an illustration of an unmanned aerial vehicle with exemplary vectors in accordance with an illustrative embodiment.

Turning now to FIG. 5, an illustration of an unmanned aerial vehicle with exemplary vectors is depicted in accordance with an illustrative embodiment. Unmanned aerial vehicle 500 is a physical implementation of an unmanned aerial vehicle of plurality of unmanned aerial vehicles 106 of FIG. 1.

In view 502, unmanned aerial vehicle 500 has vector 504 representing a speed and a heading selected by unmanned aerial vehicle 500. The speed and the heading selected by unmanned aerial vehicle 500 may be part of a flight plan followed by unmanned aerial vehicle 500.

In view 502, unmanned aerial vehicle 500 has vector 506 representing a speed and a heading above ground. The speed and heading represented by vector 506 may be determined through usage of a GPS system.

Using vector addition, vector 508 is determined. Vector 508 represents wind speed and wind direction.

The wind speed and the wind direction represented by vector 508 may be determined by wind speed calculator 108 of FIG. 1 using vector addition. The wind speed and wind direction represented by vector 508 may be stored in database 144 of FIG. 1. The wind speed and wind direction represented by vector 508 may be used to form three-dimensional model 156 of FIG. 1.

Figure 6:
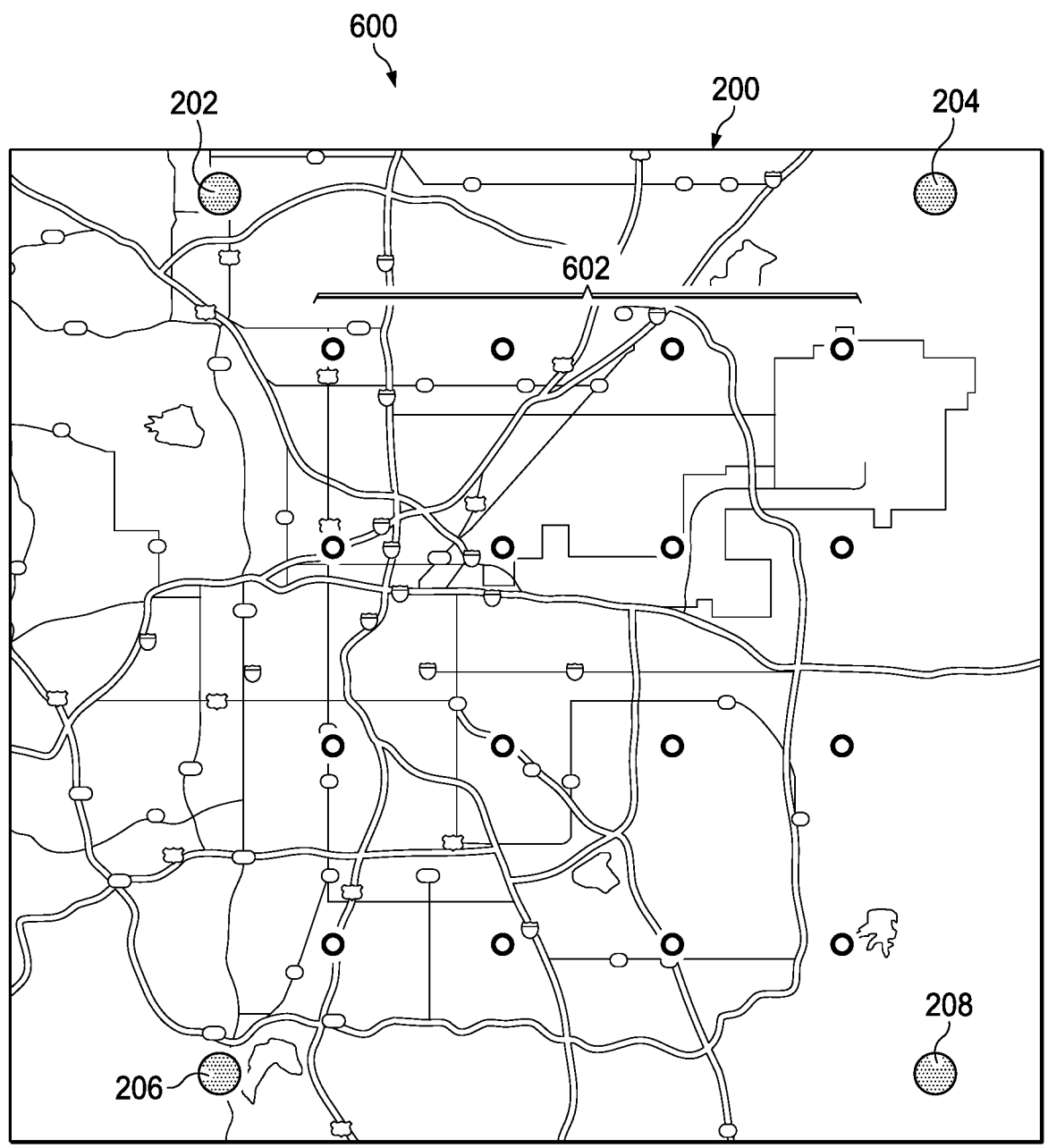
FIG. 6 is an illustration of a two-dimensional view of set grid points in a region in accordance with an illustrative embodiment.

Turning now to FIG. 6, an illustration of a two-dimensional view of set grid points in a region is depicted in accordance with an illustrative embodiment. As depicted, view 600 of region 200 is bounded by marker 202, marker 204, marker 206, and marker 208. In view 600, set grid points 602 are positioned within region 200. As depicted, set grid points 602 are spaced regularly within region 200.

Figure 7:
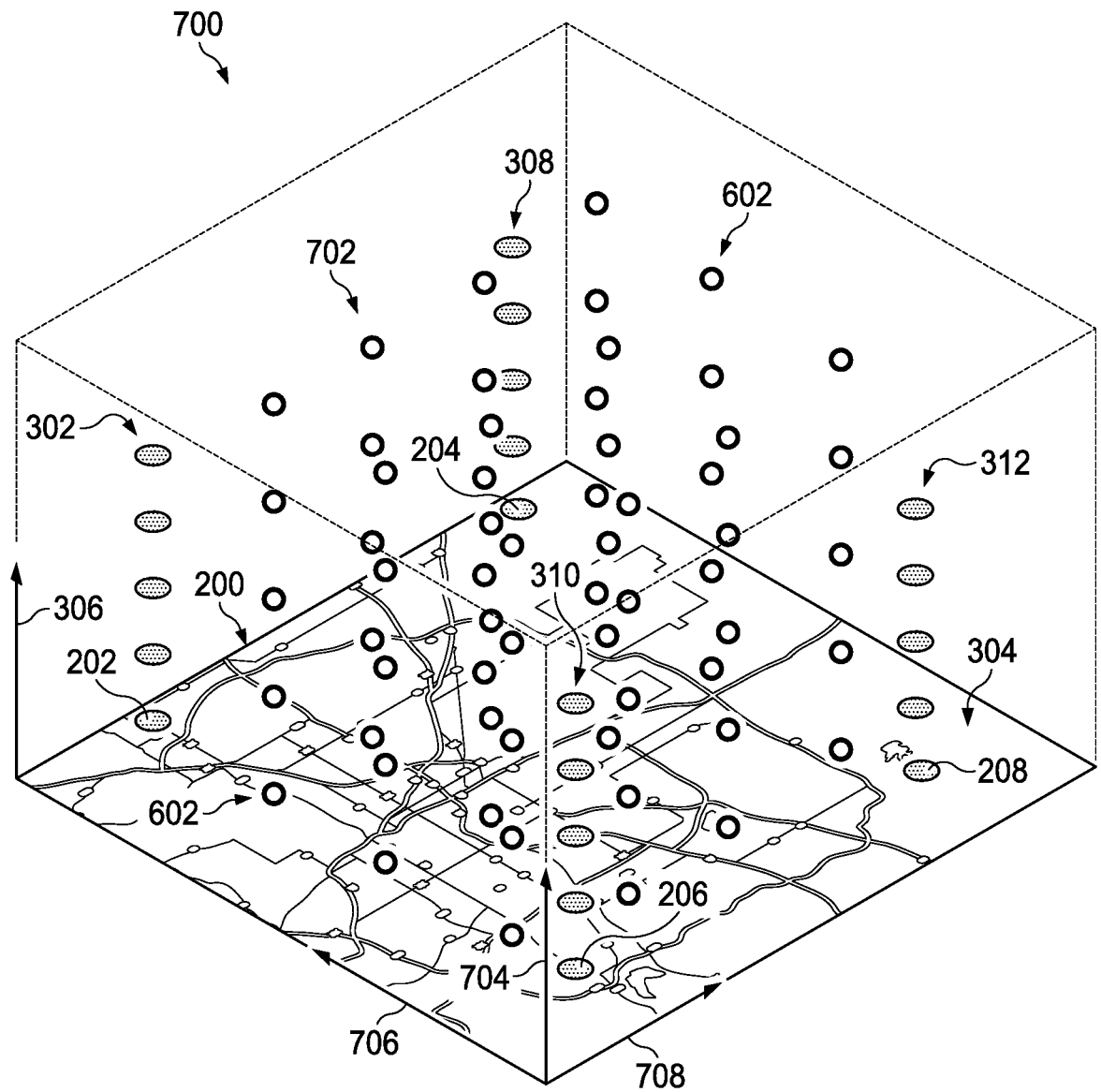
FIG. 7 is an illustration of a three-dimensional view of set grid points in a region in accordance with an illustrative embodiment.

Turning now to FIG. 7, an illustration of a three-dimensional view of set grid points in a region is depicted in accordance with an illustrative embodiment.

View 700 is a three-dimensional view of region 200 of FIG. 2 with set grid points 602. As can be seen in view 700, set grid points 602 is three-dimensional grid 702. Three-dimensional grid 702 is regularly spaced in direction 704, direction 706, and direction 708.

Set grid points 602 form three-dimensional grid 702. Three-dimensional grid 702 is defined in lateral and vertical dimensions. Three-dimensional grid 702 explicitly defines locations by latitude/longitude/altitude.

Figure 8:
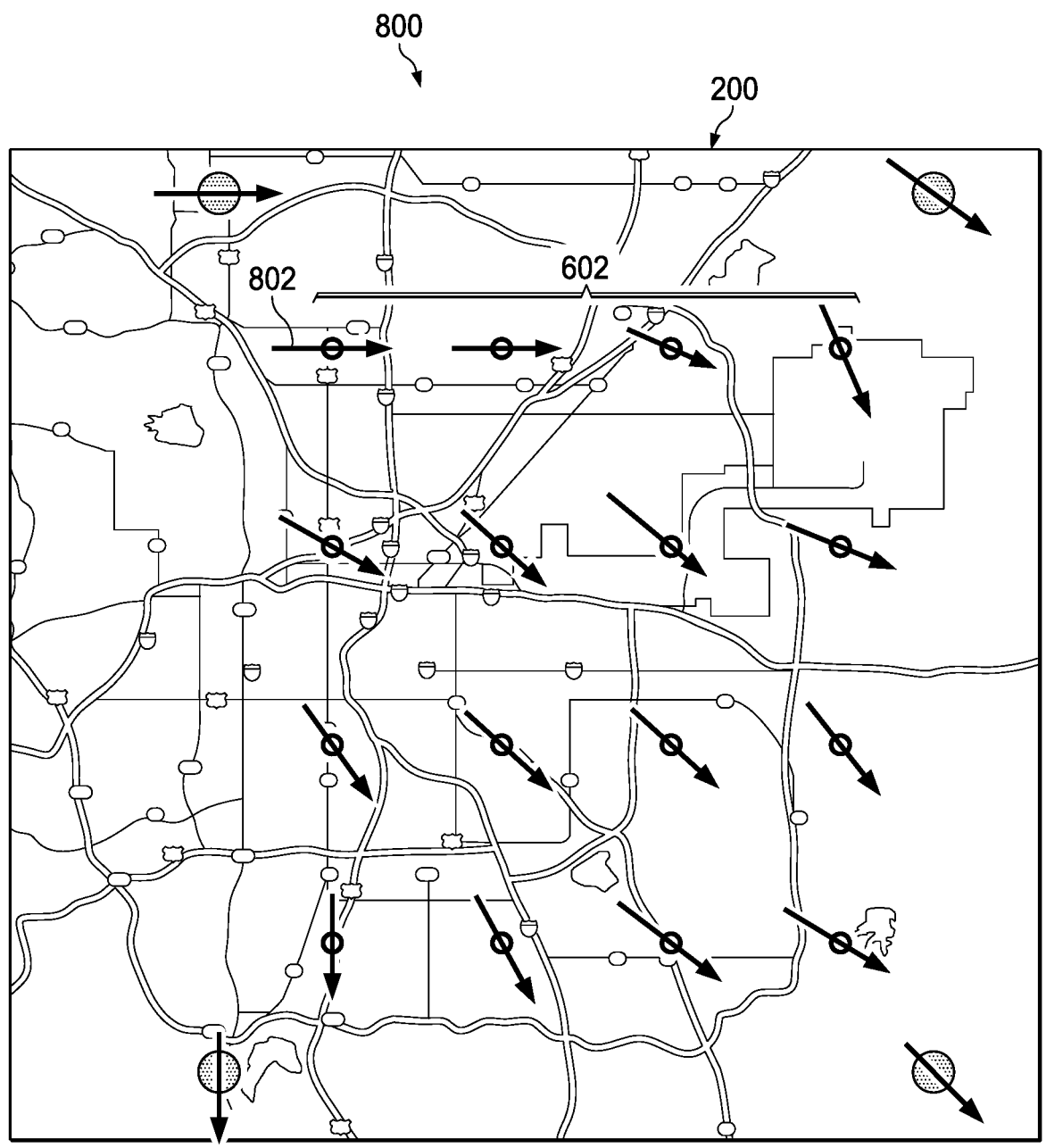
FIG. 8 is an illustration of a two-dimensional view of interpolated wind vectors at set grid points in a region in accordance with an illustrative embodiment.

Turning now to FIG. 8, an illustration of a two-dimensional view of interpolated wind vectors at set grid points in a region is depicted in accordance with an illustrative embodiment. In view 800, set grid points 602 are replaced by interpolated wind vectors 802.

Each of interpolated wind vectors 802 represents wind vectors determined by a three-dimensional model, such as three-dimensional model 156 of FIG. 1. Each of interpolated wind vectors 802 includes a wind speed and a wind direction. Each of interpolated wind vectors 802 is associated with a point of set grid points 602. Although interpolated wind vectors 802 are only depicted in a two-dimensional view on a lateral scale, interpolated wind vectors 802 may also be calculated at different altitudes.

Figure 9:
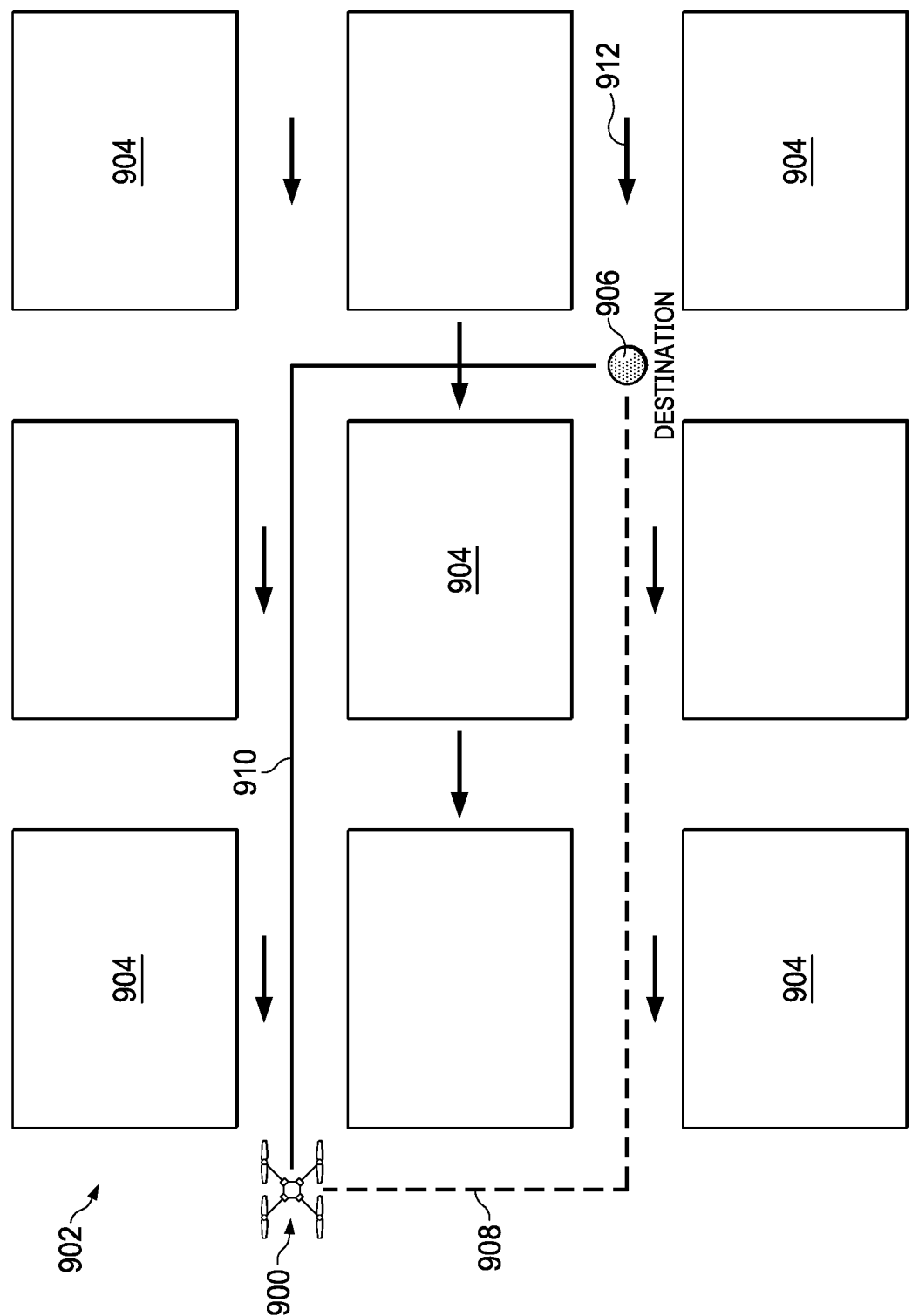
FIG. 9 is an illustration of a two-dimensional view of an unmanned aerial vehicle with an original flight plan and a new flight plan taking into account micro wind conditions in accordance with an illustrative embodiment.

Turning now to FIG. 9, an illustration of a two-dimensional view of an unmanned aerial vehicle with an original flight plan and a new flight plan taking into account micro wind conditions is depicted in accordance with an illustrative embodiment. Unmanned aerial vehicle 900 operates within region 902. In this illustrative example, region 902 includes buildings 904. In this illustrative example, unmanned aerial vehicle 900 has destination 906. Path 908 is an initial path. Path 908 may be determined using any desirable method. In some illustrative examples, path 908 may be the fastest path without winds. In some illustrative examples, path 908 may be the most direct path.

Path 910 is a modified flight path, such as modified flight plan 172 of FIG. 1. In this illustrative example, path 910 is created based on wind vectors 912 in region 902. In some illustrative examples, wind vectors 912 are determined in real-time. In some illustrative examples, when wind vectors 912 are determined in real-time, wind vectors 912 may be directly measured by unmanned aerial vehicles. For example, wind vectors 912 may be examples of wind measurements 128 of FIG. 1. In some illustrative examples, when wind vectors 912 are determined in real-time, wind vectors 912 may be indirectly determined from observed speeds and observed headings, such as observed speeds 138 and observed headings 140 of FIG. 1. In some illustrative examples, unmanned aerial vehicle 900 may contribute measurements to wind vectors 912. In some other illustrative examples, unmanned aerial vehicle 900 does not contribute measurements to wind vectors 912.

In other illustrative examples, wind vectors 912 are interpolated from wind vectors determined. In these illustrative examples, wind vectors 912 may be examples of interpolated wind vectors 164 of FIG. 1. When wind vectors 912 are interpolated from wind vectors determined, wind vectors 912 are interpolated using wind vectors determined using measurements taken within region 902. In some illustrative examples, the measurements are taken by other unmanned aerial vehicles than unmanned aerial vehicle 900. In some illustrative examples, unmanned aerial vehicle 900 took at least one measurement of the measurements within region 902 used to form wind vectors 912.

In yet other illustrative examples, wind vectors 912 are generated by a three-dimensional wind prediction map, such as three-dimensional wind prediction map 168 of FIG. 1. In these illustrative examples, wind vectors 912 are generated when a coarsely-grained forecast, such as coarsely grained forecast 150 of FIG. 1, is provided to a three-dimensional wind prediction map generator, such as three-dimensional wind map generator 160 of FIG. 1.

Path 910 may be generated to decrease flight time to destination 906. Path 910 may be generated to decrease turbulence experienced by unmanned aerial vehicle 900. Path 910 may be generated to increase fuel efficiency of unmanned aerial vehicle 900.

Figure 10:
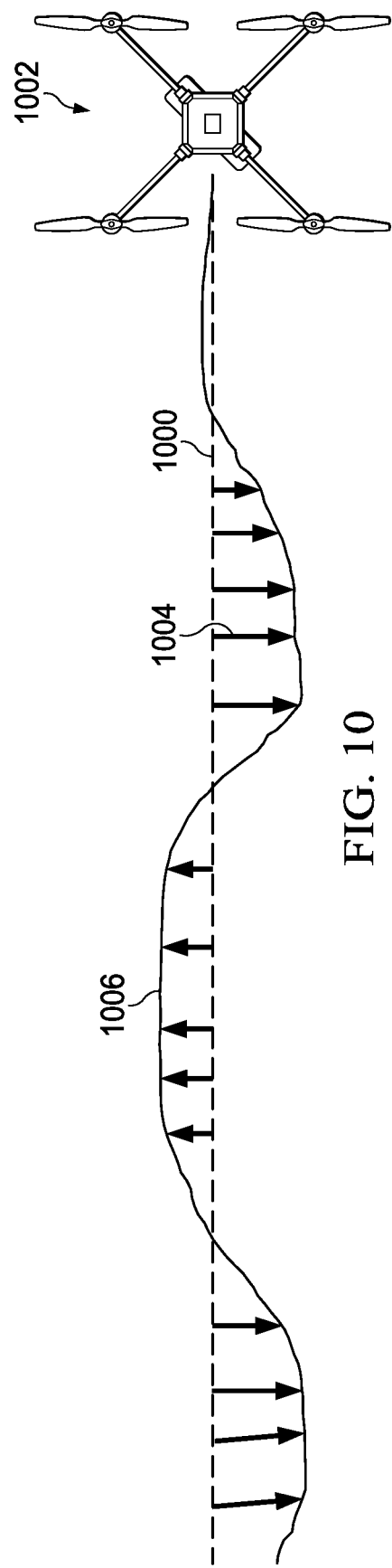
FIG. 10 is an illustration of differences between an actual track and a planned track for an unmanned aerial vehicle.

Turning now to FIG. 10, an illustration of differences between a desired path and an actual path for an unmanned aerial vehicle is depicted in accordance with an illustrative embodiment. Path 1000 is a desired path for unmanned aerial vehicle 1002. Unmanned aerial vehicle 1002 is a physical implementation of one of plurality of unmanned aerial vehicles 106 of FIG. 1. Wind vectors 1004 are changes to winds that have not been identified by other plurality of unmanned aerial vehicles. In attempting to fly along path 1000, unmanned aerial vehicle 1002 will actually follow path 1006 due to wind vectors 1004. Although path 1000 and path 1006 are described as for unmanned aerial vehicle 1002, paths may also be generated for conventional aircraft.

Wind vectors 1004 may be reported to system 102 using measurements from unmanned aerial vehicle 1002. In some illustrative examples, the measurements may be direct measurements of wind vectors 1004 using a sensor (not depicted) on unmanned aerial vehicle 1002. In some illustrative examples, the measurements may be indirect measurements of wind vectors 1004 by directly measuring path 1000 and path 1006.

In this illustrative example, unmanned aerial vehicle 1002 is in-flight. To correct for wind vectors 1004 encountered during flight, unmanned aerial vehicle 1002 will try to return to path 1000. During flight, unmanned aerial vehicle 1002 sends measurements related to wind vectors 1004 such that other unmanned aerial vehicles (not depicted) may anticipate and compensate for wind vectors 1004 prior to encountering wind vectors 1004. In some illustrative examples, measurements taken by unmanned aerial vehicle 1002 may be used by other unmanned aerial vehicles (not depicted) to identify paths that avoid wind vectors 1004.

The different components shown in FIGS. 2-10 may be combined with components in FIG. 1, used with components in FIG. 1, or a combination of the two. Additionally, some of the components in FIGS. 2-10 may be illustrative examples of how components shown in block form in FIG. 1 can be implemented as physical structures.

Figure 11A:
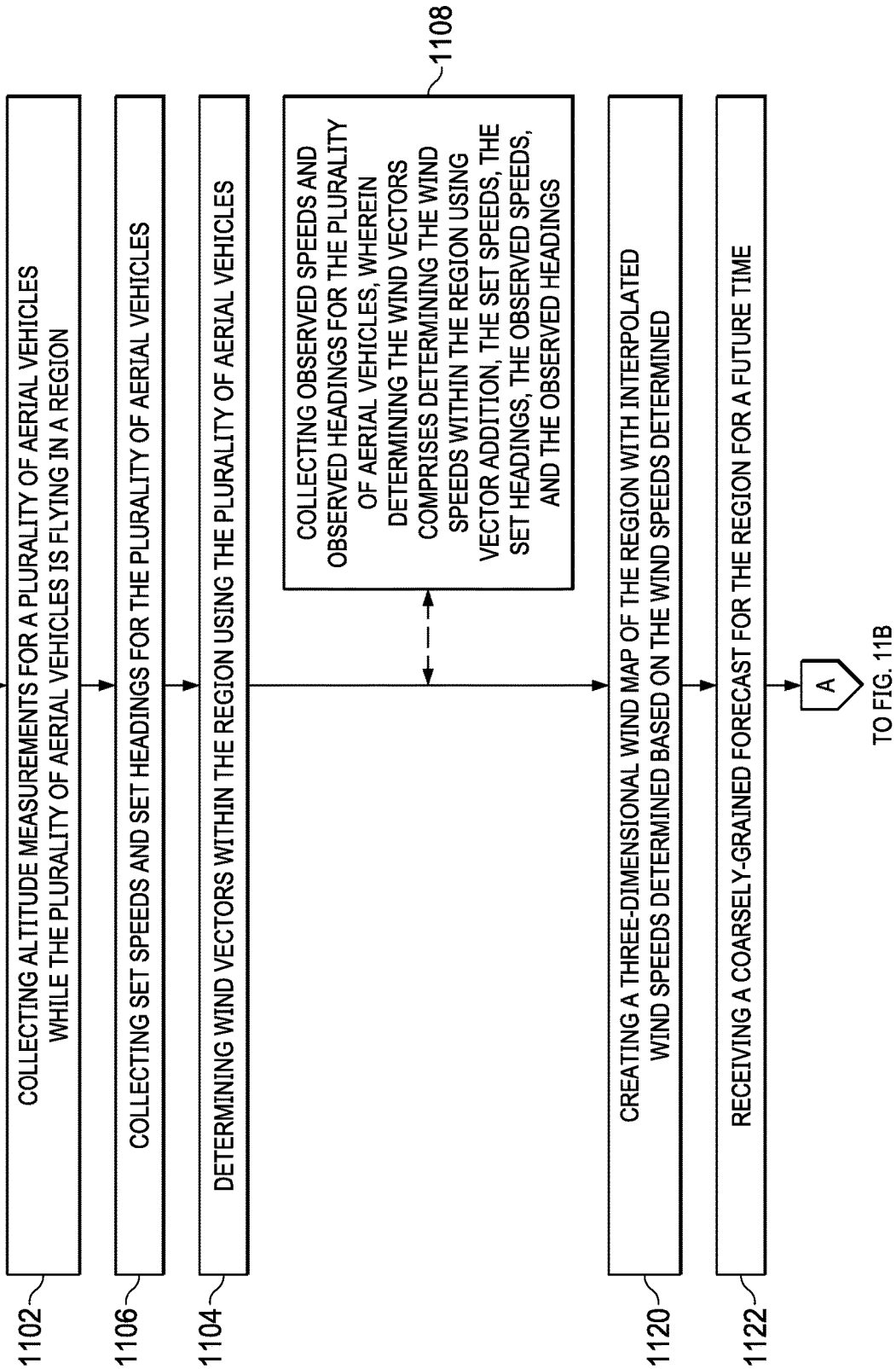

Turning now to FIGS. 11A and 11B, an illustration of a flowchart of a method for flying an unmanned aerial vehicle in a region based on wind vectors determined in the region is depicted in accordance with an illustrative embodiment. Method 1100 may be implemented using system 102 of FIG. 1. Method 1100 may be used to determine wind vectors, such as wind vectors 111, interpolated wind vectors 164, or predicted wind vectors 170 of FIG. 1. Method 1100 may be used to fly unmanned aerial vehicle 116 in region 104 of FIG. 1. Method 1100 may be used in region 200 of FIGS. 2-4 and FIGS. 6-8. Method 1100 may be used to fly unmanned aerial vehicle 500 of FIG. 5. Method 1100 may be used to plan path 910 of FIG. 9.

Method 1100 collects altitude measurements for a plurality of aerial vehicles while the plurality of aerial vehicles is flying in a region (operation 1102). In some illustrative examples, the region is within a single 0.5° lateral resolution grid. In some illustrative examples, the region is at least one of a suburban region or an urban region.

Method 1100 determines wind vectors within the region using the plurality of aerial vehicles (operation 1104). In some illustrative examples, wind vectors are determined directly within the region using wind sensors on the plurality of aerial vehicles. In these illustrative examples, the wind vectors are determined using wind measurements taken from wind sensors on the plurality of aerial vehicles.

In some other illustrative examples, the wind vectors are determined indirectly within the region using measurements from sensors attached to the plurality of aerial vehicles. In these illustrative examples, method 1100 may collect set speeds and set headings for the plurality of aerial vehicles (operation 1106). In these illustrative examples, method 1100 also collects observed speeds and observed headings for the plurality of aerial vehicles, wherein determining the wind vectors comprises determining the wind vectors within the region using vector addition, the set speeds, the set headings, the observed speeds, and the observed headings (operation 1108).

Method 1100 plans a flight plan within the region for an aerial vehicle based on the wind vectors determined (operation 1110). In some illustrative examples, the aerial vehicle is an unmanned aerial vehicle. In some illustrative examples, wherein the aerial vehicle is an unmanned aerial vehicle and wherein planning the flight plan within the region for the aerial vehicle comprises: determining a maximum acceptable turbulence for cargo of the unmanned aerial vehicle; and planning the flight plan such that the unmanned aerial vehicle is projected to encounter turbulence below the maximum acceptable turbulence (operation 1112). In some illustrative examples, wherein the aerial vehicle is an unmanned aerial vehicle and wherein planning the flight plan within the region for the aerial vehicle comprises: determining a deliver by time for cargo of the unmanned aerial vehicle; and planning the flight plan such that the unmanned aerial vehicle is projected to deliver the cargo prior to the deliver by time (operation 1114).

In some illustrative examples, planning the flight plan within the region for the aerial vehicle based on the wind vectors determined comprises creating a modified flight plan for the aerial vehicle while the aerial vehicle is actively flying (operation 1116). In these illustrative examples, the modified flight plan takes into account any desirable parameters for at least one of the aerial vehicle or cargo carried by the aerial vehicle.

Method 1100 flies the unmanned aerial vehicle within the region according to the flight plan (operation 1118). To fly the unmanned aerial vehicle within the region, the flight plan is communicated to the unmanned aerial vehicle by a communications system operably connected to a real-time wind analysis apparatus, such as real-time wind analysis apparatus 154 of FIG. 1.

In some illustrative examples, method 1100 creates a three-dimensional wind map of the region with interpolated wind vectors determined based on the wind vectors determined (operation 1120). In some illustrative examples, method 1100 receives a coarsely-grained forecast for the region for a future time (operation 1122). In these illustrative examples, method 1100 may generate a three-dimensional wind prediction map for the region for the future time using a three-dimensional model of the region and the coarsely-grained forecast, wherein planning the flight path within the region comprises planning the flight path using the three-dimensional wind prediction map for the region for the future time (operation 1124).

Figure 12:
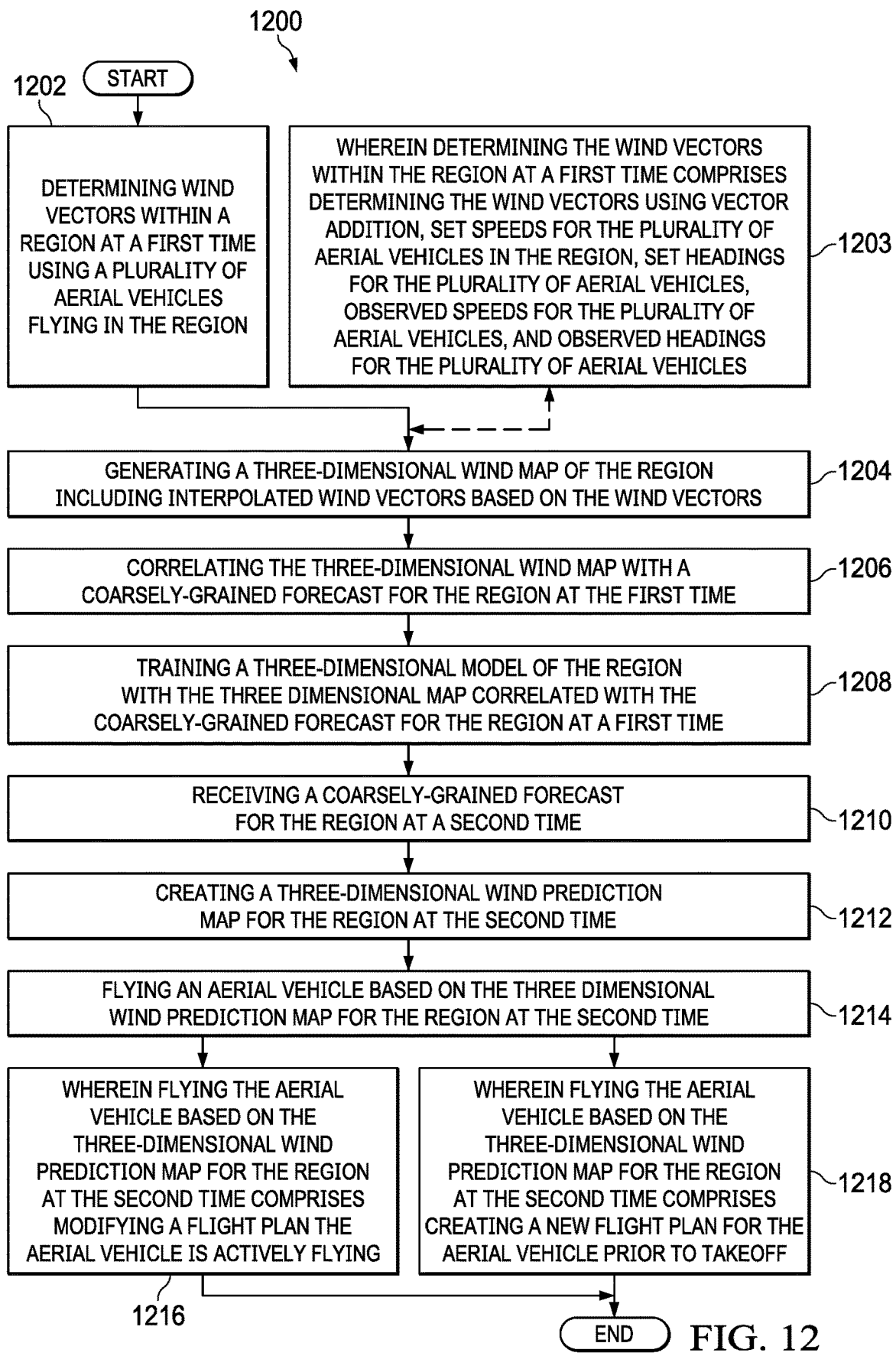
FIG. 12 is an illustration of a flowchart of a method for flying an aerial vehicle in a region in accordance with an illustrative embodiment.

Turning now to FIG. 12, an illustration of a flowchart of a method for flying an unmanned aerial vehicle in a region is depicted in accordance with an illustrative embodiment. Method 1200 may be implemented using system 102 of FIG. 1. Method 1200 may be used to determine wind vectors, such as wind vectors 111, interpolated wind vectors 164, or predicted wind vectors 170 of FIG. 1. Method 1200 may be used to fly unmanned aerial vehicle 116 in region 104 of FIG. 1. Method 1200 may be used in region 200 of FIGS. 2-4 and FIGS. 6-8. Method 1200 may be used to fly unmanned aerial vehicle 500 of FIG. 5. Method 1200 may be used to plan path 910 of FIG. 9.

Method 1200 determines wind vectors within a region at a first time using a plurality of aerial vehicles (operation 1202). In some illustrative examples, wind vectors are determined directly within the region using wind sensors on the plurality of aerial vehicles. In these illustrative examples, the wind vectors are determined using wind measurements taken from wind sensors on the plurality of aerial vehicles.

In some other illustrative examples, the wind vectors are determined indirectly within the region using measurements from sensors attached to the plurality of aerial vehicles. In some illustrative examples, determining the wind vectors within the region at a first time comprises determining the wind vectors using vector addition, set speeds for the plurality of aerial vehicles in the region, set headings for the plurality of aerial vehicles, observed speeds for the plurality of aerial vehicles, and observed headings for the plurality of aerial vehicles (operation 1203).

Method 1200 generates a three-dimensional wind map of the region including interpolated wind vectors based on the wind vectors (operation 1204). Method 1200 correlates the three-dimensional wind map with a coarsely-grained forecast for the region at the first time (operation 1206). Method 1200 trains a three-dimensional model of the region with the three-dimensional wind map correlated with the coarsely-grained forecast for the region at the first time (operation 1208). Method 1200 receives a coarsely-grained forecast for the region at a second time (operation 1210). Method 1200 creates a three-dimensional wind prediction map for the region at the second time (operation 1212). Method 1200 flies an aerial vehicle based on the three-dimensional wind prediction for the region at the second time (operation 1214).

In some illustrative examples, flying the aerial vehicle based on the three-dimensional wind prediction for the region at the second time comprises modifying a flight plan that the aerial vehicle is actively flying (operation 1216). In some illustrative examples, flying the aerial vehicle based on the three-dimensional wind prediction for the region at the second time comprises creating a new flight plan for the aerial vehicle prior to takeoff (operation 1218).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 1100 are performed. For example, at least one of operation 1106, operation 1108, operation 1120, or operation 1122 are optional. In some illustrative examples, not all blocks of method 1200 are performed. For example, at least one of operation 1216 or operation 1218 are optional.

The illustrative examples provide a means to establish a four-dimensional weather model. The four-dimensional weather model of the illustrative examples is able to predict winds in lateral and vertical terms. In some illustrative examples, the four-dimensional weather model is also able to predict disturbances or turbulence in lateral and vertical terms.

Instead of relying on coarsely-grained "macro" weather forecasts, the illustrative examples generate, for a limited three-dimensional space, a more detailed picture of microscopic winds in this space. These winds are able to be predicted ahead of an arbitrary point in time. The winds can be used to create flight plans that, due to the finer-grained nature of the weather forecasts of the illustrative examples, take into account the more realistic wind and precipitation conditions.

By taking into account the more realistic wind and precipitation conditions, an operator with a multitude of drones will be able to experience less unforeseen disruptions to operations. Reducing unforeseen disruptions to operations thereby increases the operator's reliability and therefore its own customer satisfaction. This method relies on an "Internet of Things"-system, specifically the drones of the operator themselves, as well as any and all available measurements on meteorological conditions.

Drones may fly significantly shorter distances than commercial aircraft, with the details of the weather not known, as the conventional forecast is too coarse. The illustrative examples fill this gap, as they model the wind situation in a limited, pre-defined space (e.g. a city in which a drone operator operates and delivers its products).

The illustrative examples provide two main benefits: first, a drone operator is able to determine the current condition of winds in a three-dimensional area. Determining the current condition of winds helps with awareness of the current wind situation. Further, the illustrative examples are able to generate a predicted three-dimensional wind view. The finer resolution is more useful to drone flights in this area than only relying on the coarse NWS forecasts. Drone flight plans may therefore be closer to the true trajectory and/or flight time prescribed, thus increasing predictability. The drone operator may be able to provide a higher accuracy to its customers in turn, by more accurately predicting when a product will be delivered to the customer.

Also, with this information on microscopic winds, the drone operator is able to fly routes that are more energy-efficient. This results in lesser energy consumption and hence, less costs.

The illustrative examples may also provide benefits with turbulence measurements. Associating turbulence with four-dimensional locations can bring benefit to drone flight planning. Too many disturbances in flight may not be cost-efficient. Additionally, too many disturbances in flight may damage cargo, depending on the cargo the drone is carrying.

In general, acceptable levels of disturbances can be tied to the load carried. Some loads might only receive a certain amount of turbulence, otherwise cargo might be damaged. If applying this concept to "flying taxis," the route can be determined based on the values of travel time in combination with passenger comfort as well. In general, a live re-planning is also supported and can be tied to the unmanned aerial vehicle knowing the allowed parameters for whatever is carried.

Knowing winds on a finer scale/resolution may be more beneficial than relying on a coarse grid, as it better reflects the true wind speed situation. For airframers, this fine granular resolution would be of limited benefit during long range cruise considering their size and speed. However, for smaller vehicles like unmanned aerial vehicles (UAVs) or "flying taxis" that are a lot smaller than commercial aircraft, have a significantly smaller range of operations, and move slower, a higher resolution for weather information is of significant benefit.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system configured to:
    derive a value for wind conditions for a region that comprises a dimension less than 0.5° latitude and a vertical resolution of less than 50 millibars; and
    generate a three-dimensional wind prediction map for the region for a future time, such that the system comprises:
        a plurality of aerial vehicles within the region; and
        a computer system that comprises:
            a wind speed calculator configured to determine vectors of the value at every grid point within a three-dimensional grid within the region based upon measurements from the plurality of aerial vehicles;
            a wind analysis apparatus configured to:
                form an instance pair that matches the vectors at a first time to a forecast for the region at the first time, such that the forecast for the region at the first time comprises wind conditions adjacent to the region; and
                train, based upon the instance pair, a three-dimensional model of the region that comprises buildings, vegetation, and structures in the region;
                based upon: the instance pair for each of the vectors, the three-dimensional model of the region, and receipt of a forecast for the region at the future time, generate the three-dimensional wind prediction map for the region for the future time, such that the forecast for the region at the future time comprises wind conditions adjacent to the region at the future time;
                generate a plan for a flight of an unmanned vehicle in the region at the future time based upon:
                    the three-dimensional wind prediction map for the region;
                    an acceptable turbulence for a cargo on the unmanned vehicle; and
                    a deliver by time for the cargo on the unmanned vehicle; and
                modify the plan while the unmanned vehicle is in flight in the region based upon wind conditions derived by the system while the unmanned vehicle is in flight.

2. The system of claim 1, further comprising each of the plurality of aerial vehicles comprising an altitude sensor and a Global Positioning System (GPS) receiver.

3. The system of claim 1, wherein the wind speed calculator is configured to determine the vectors based upon vector addition and: set speeds of the plurality of aerial vehicles, set headings of the plurality of aerial vehicles, measured speeds of the plurality of aerial vehicles, and measured headings of the plurality of aerial vehicles.

4. The system of claim 1, wherein:
    the computer system further comprises a three-dimensional wind map generator configured to create a three-dimensional wind map with interpolated wind vectors within the region, wherein the interpolated wind vectors are associated with grid points of the three-dimensional grid.

5. The system of claim 4, wherein the three-dimensional wind map generator is further configured to generate the three-dimensional wind prediction map for the region for the future time.

6. The system of claim 5, wherein the computer system comprises a flight plan generator configured to modify the plan based upon wind vectors determined in real-time.

7. The system of claim 1, wherein:
the computer system further comprises a flight plan generator configured to generate the plan for the flight of the unmanned vehicle in the region at the future time.

8. The system of claim 7, wherein:
the computer system further comprises a communication system configured to communicate flight plans with the plurality of aerial vehicles.

9. The system of claim 7, wherein the flight plan generator is configured to generate the plan such that the unmanned vehicle is projected to only encounter turbulence equal to or less than the acceptable turbulence.

10. The system of claim 7, wherein the flight plan generator is configured to determine the deliver by time for the cargo of the unmanned vehicle, such that the unmanned vehicle is projected to deliver the cargo prior to the deliver by time.

11. The system of claim 7, wherein the plurality of aerial vehicles comprises a second unmanned vehicle.

12. The system of claim 1, wherein
the computer system further comprises a model training system configured to refine and update the three-dimensional model of the region based upon additional determined wind vectors and received weather service forecasts for the region.

13. The system of claim 1, wherein the region is at least one of a suburban region or an urban region.

14. A method comprising:
collecting altitude, heading, and speed, measurements for a plurality of aerial vehicles while the plurality of aerial vehicles is flying in a region that comprises a dimension less than 0.5° latitude and a vertical resolution of less than 50 millibars;
determining, using a computer system comprising a wind speed calculator and the measurements for the plurality of aerial vehicles, vectors of winds at every grid point within a three-dimensional grid within the region;
forming, using a wind analysis apparatus, an instance pair that matches the vectors at a first time to a forecast for the region at the first time, such that the forecast for the region at the first time comprises wind conditions adjacent to the region; and
training, using the wind analysis apparatus and the instance pair, a three-dimensional model of the region that comprises buildings, vegetation, and structures in the region;
generating, using the instance pair for each of the vectors, the three-dimensional model of the region, and receipt of a forecast for the region at a future time, a three-dimensional wind prediction map for a future time, such that the forecast for the region at the future time comprises wind conditions adjacent to the region at the future time;
generating a plan for a flight of an unmanned vehicle in the region at the future time based upon:
the three-dimensional wind prediction map;
an acceptable turbulence for a cargo on the unmanned vehicle; and
a deliver by time for the cargo on the unmanned vehicle; and
modifying, using real-time wind conditions determined by the computer system while the unmanned vehicle is flying, the plan while the unmanned vehicle is flying in the region.

15. The method of claim 14 further comprising: each of the plurality of aerial vehicles comprising an altitude sensor and a Global Positioning System (GPS) receiver.

16. The method of claim 15, further comprising:
flying the unmanned vehicle within the region according to the plan.

17. The method of claim 16, wherein the plurality of aerial vehicles comprises a second unmanned vehicle.

18. The method of claim 17, further comprising the plan projecting the unmanned vehicle to only encounter turbulence equal to or less than the acceptable turbulence.

19. The method of claim 17, further comprising generating the plan such that the unmanned vehicle is projected to deliver the cargo prior to the deliver by time.

20. The method of claim 14, further comprising determining at least one of the vectors of winds at grid points, within the three-dimensional grid within the region, indirectly.

21. The method of claim 14 further comprising:
collecting set speeds and set headings for the plurality of aerial vehicles; and
collecting observed speeds and observed headings for the plurality of aerial vehicles; and
determining the vectors of winds at grid points within the region using: vector addition, the set speeds, the set headings, the observed speeds, and the observed headings.

22. The method of claim 14, wherein the region comprises a dimension of less than 0.5° longitude.

23. The method of claim 22, wherein the region is at least one of a suburban region or an urban region.

24. The method of claim 14 further comprising:
creating a three-dimensional wind map of the region with interpolated wind vectors determined based on the vectors of winds.

25. The method of claim 14 further comprising:
the computer system further comprising a model training system for refining and updating the three-dimensional model of the region.

26. A method comprising:
determining wind vectors within a region at a first time using a computer system and a plurality of aerial vehicles flying in the region, such that the region comprises a dimension less than 0.5° latitude and a vertical resolution of less than 50 millibars;
forming, using a wind analysis apparatus, an instance pair that matches the wind vectors within the region at the first time to a forecast for the region at the first time, such that the forecast for the region at the first time comprises wind conditions adjacent to the region; and
training, using the wind analysis apparatus and the instance pair, a three-dimensional model of the region that comprises buildings, vegetation, and structures in the region;
generating, using the instance pair, the three-dimensional model of the region, and receipt of a forecast for the region at a future time, a three-dimensional wind map of the region including interpolated wind vectors at grid points within a three-dimensional grid within the region based on the wind vectors, such that the forecast for the region at the future time comprises wind conditions adjacent to the region at the future time;

receiving a weather service forecast for the region at the future time; and creating a three-dimensional wind prediction map for the grid points within the three-dimensional grid within the region at the future time;

generating a plan for a flight of an unmanned vehicle in the region at the future time based upon:
- the three-dimensional wind prediction map;
- an acceptable turbulence for a cargo on the unmanned vehicle; and
- a deliver by time for the cargo on the unmanned vehicle; and modifying, using wind conditions determined by the computer system while the unmanned vehicle is flying, the plan while the unmanned vehicle is flying in the region.

27. The method of claim 26, wherein the plurality of aerial vehicles comprises a second unmanned aerial vehicle.

28. The method of claim 26, wherein determining the wind vectors within the region at the first time comprises determining the wind vectors using vector addition, set speeds for the plurality of aerial vehicles in the region, set headings for the plurality of aerial vehicles, observed speeds for the plurality of aerial vehicles, and observed headings for the plurality of aerial vehicles.

29. The method of claim 26 further comprising:
flying the unmanned vehicle based on the three-dimensional wind prediction map for the region at the future time.

30. The method of claim 29, wherein flying the unmanned vehicle based on the three-dimensional wind prediction map for the region at the future time comprises delivering the cargo prior to the deliver by time.

31. The method of claim 29, wherein flying the unmanned vehicle based on the three-dimensional wind prediction map for the region at the future time comprises creating a new flight plan for the unmanned vehicle prior to takeoff.

\* \* \* \* \*